Patented June 18, 1946

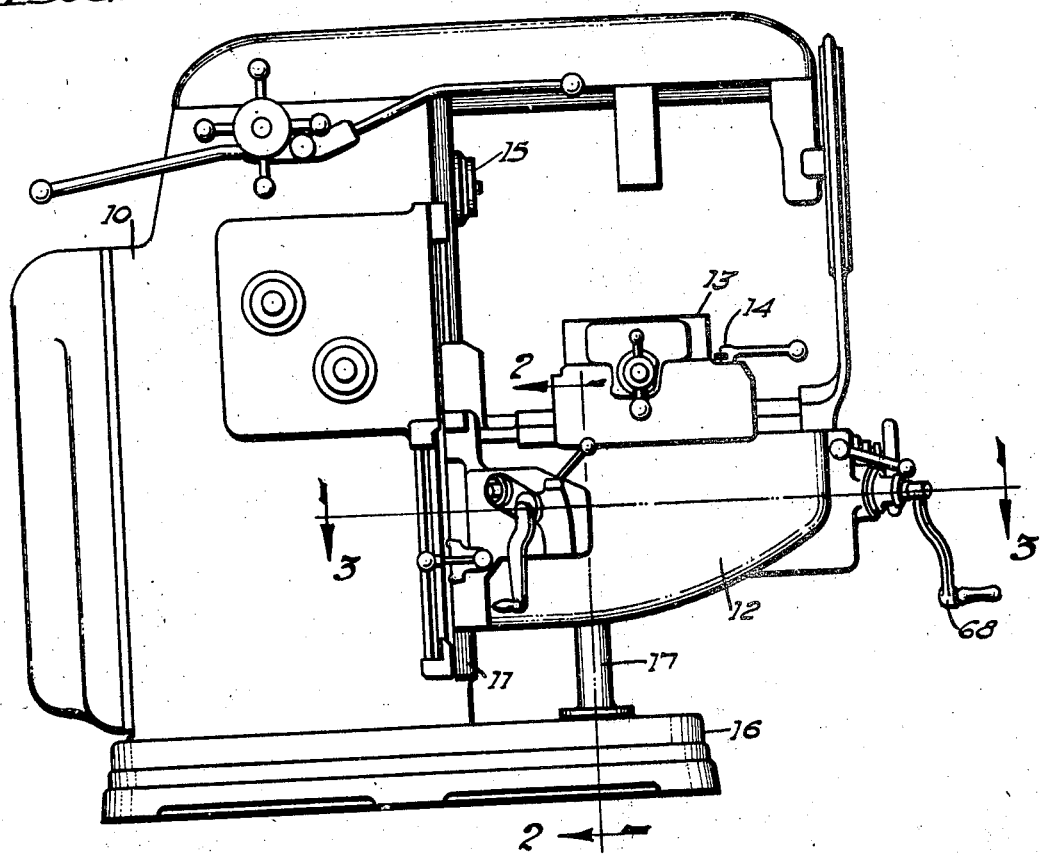
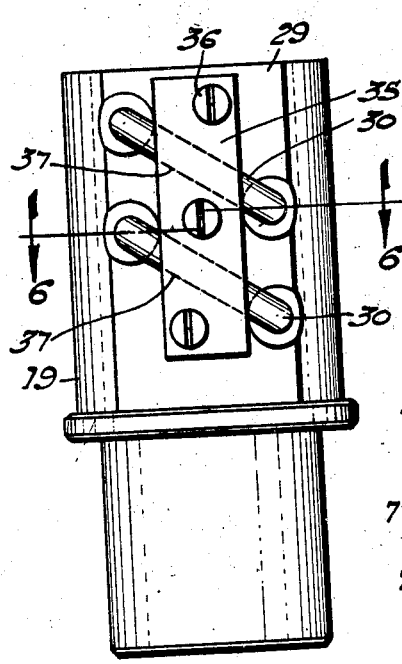
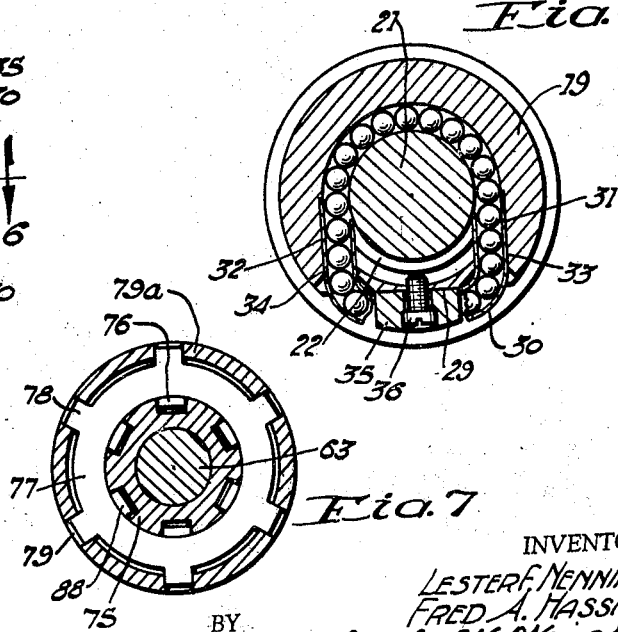

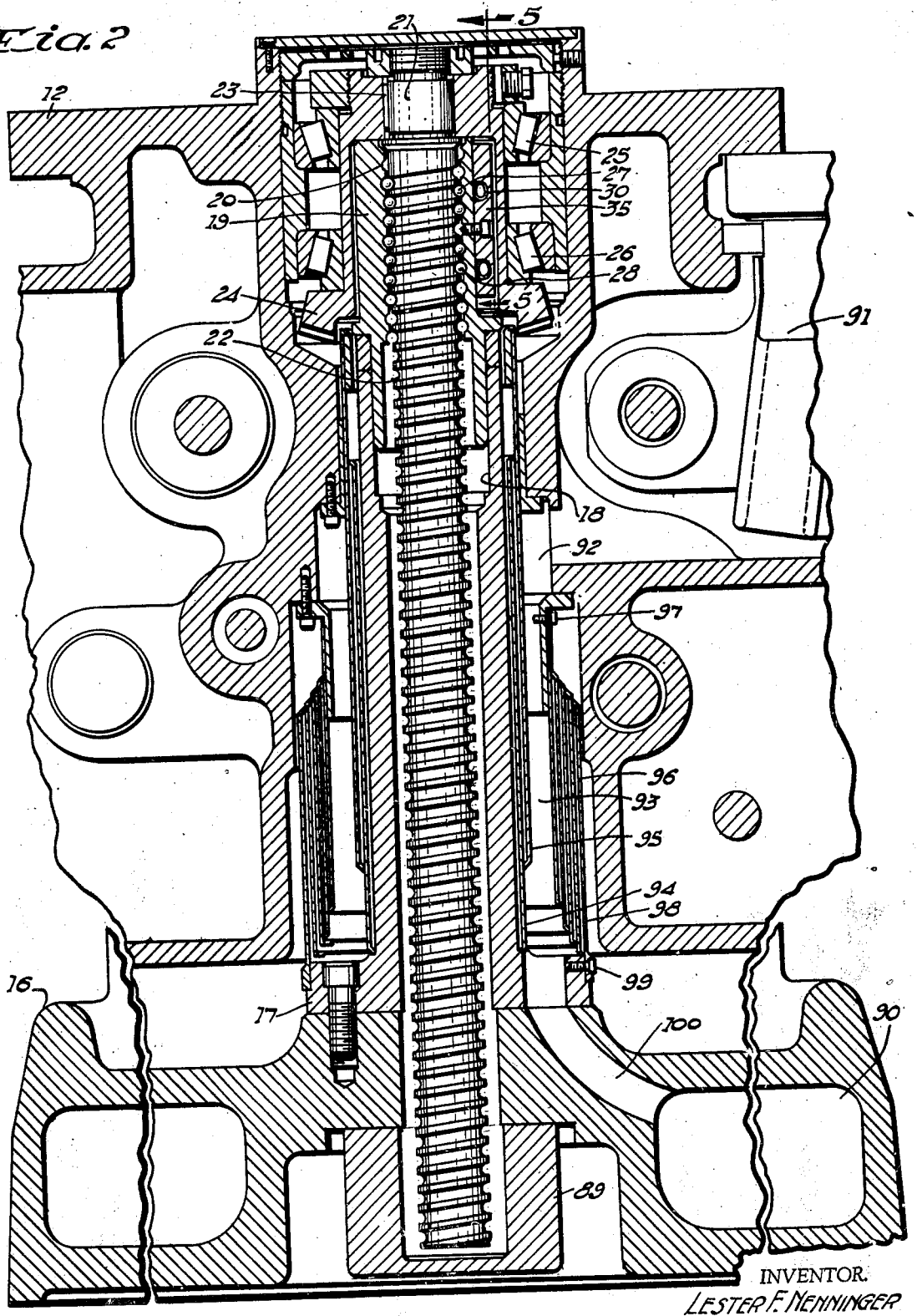

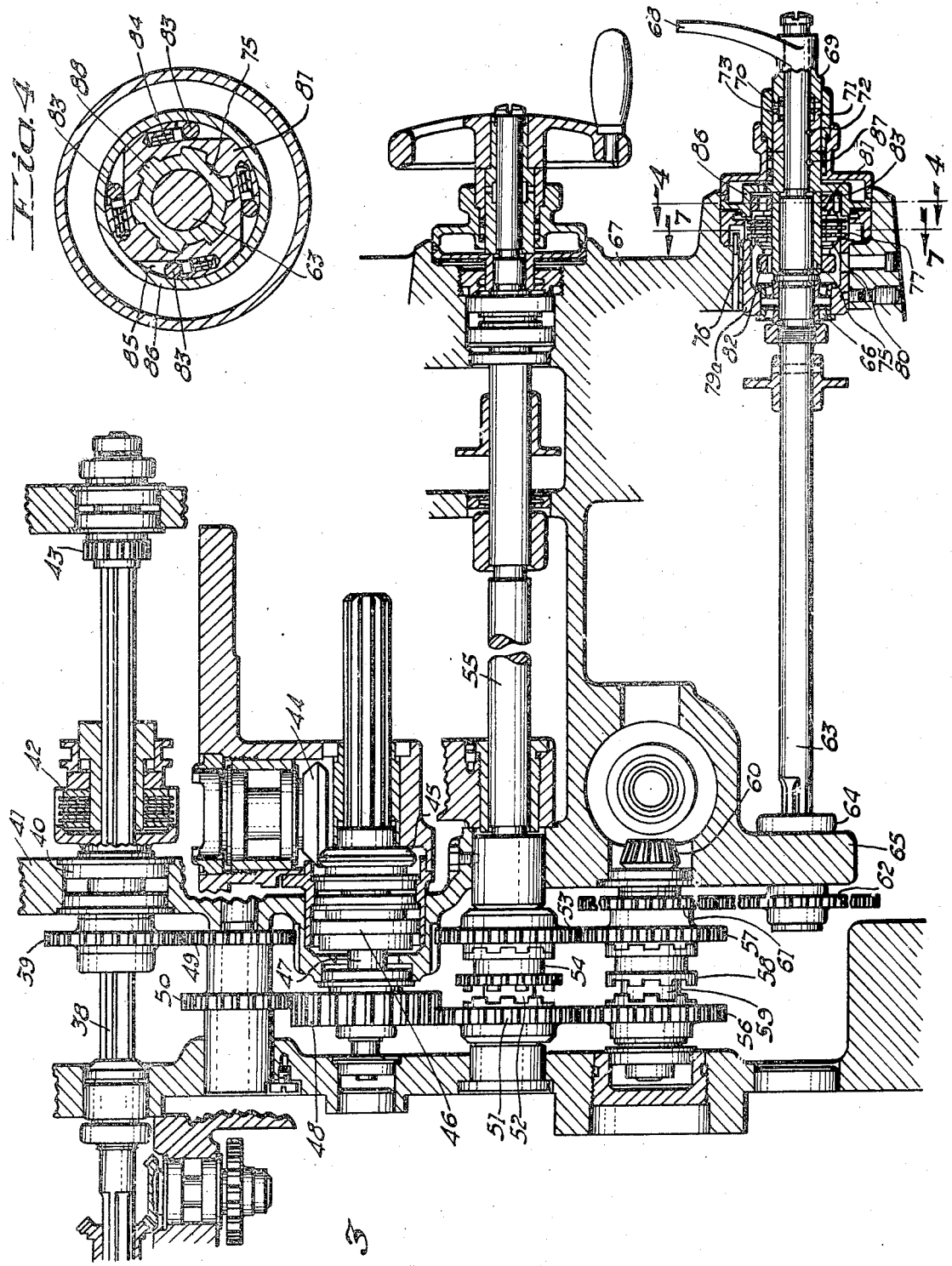

2,402,290

UNITED STATES PATENT OFFICE 2,402,290

KNEE ACTUATING MECHANISM FOR MILLING MACHINES

Lester F. Nenninger and Fred A. Hassman, Cincinnati, Ohio, assignors to The Cincinnati Milling Machine Co., Cincinnati, Ohio, a corporation of Ohio Application September 9, 1943, Serial No. 501,714

7 Claims. (Cl. 90—21)

This invention relates to machine tools and more particularly to improvements in milling machines.

One of the objects of this invention is to make improvements in the operating and control mechanism of a milling machine.

Another object of this invention is to reduce the power required to operate the knee elevating mechanism, thereby facilitating manual operation.

A more particular object of this invention is to provide an improved anti-friction knee elevating mechanism for a milling machine or the like.

A further object of this invention is to contrive a knee elevating mechanism in such a manner that the coolant normally utilized with such a machine may be led or conducted in a heat exchanging relationship with the operating parts and thereby uniformize the temperature throughout the knee mechanism and thus preserve any precision setting of the machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 2 is a section on the line 2—2 of Figure 1.

Figure 3 is a section on the line 3—3 of Figure 1.

Figure 4 is a detail section on the line 4—4 of Figure 3.

Figure 5 is a detailed view in elevation of the exterior of the nut member as viewed on the line 5—5 of Figure 2.

Figure 6 is a detail section on the line 6—6 of Figure 5.

Figure 7 is a section on the line 7—7 of Figure 3.

This invention relates to elevating mechanisms for vertically moving machine parts and will be described in connection with a movable part of a machine tool such as the knee of a milling machine. In Figure 1 of the drawings there is shown a typical milling machine having a column, which is indicated by the reference numeral 10, on which is formed guideways 11 for receiving a knee 12 for vertical movement or adjustment. This movement or adjustment is primarily for the purpose of changing the relationship between the top surface of the table 13, which is supported on the knee through the medium of an interposed saddle 14, relative to the axis of a cutter spindle 15, which is journaled for rotation in the column 10.

The table 13 is supported on the saddle 14 for translation in a horizontal plane, while the saddle 14 is supported for translation on the knee in a horizontal plane but in a direction at right angles to the direction of movement of the table. It will be obvious that any change in the position of the knee, which might be caused by uneven expansions thereof, may affect the accuracy of any machining operation.

It is common practice to raise or lower the knee through the medium of a screw and nut mechanism, but it will be noted that the combined knee, saddle and table hang from the column in cantilever fashion, and since the total weight of these parts is very considerable a great amount of friction is developed in the screw and nut mechanism, which, in addition to the added weight which has to be moved, requires a large amount of power to effect any change in position. Even although reduction gearing is utilized it is still a strenuous job for the operator to manually effect adjustment of this structure.

By means of this invention the amount of friction developed in an elevating movement is very greatly reduced, thereby facilitating manual operation as well as reducing the power required during a power operation.

Referring more particularly to Figures 1 and 2, the machine is provided with a base 16 upon which is formed an upstanding pedestal 17. The upper end of this pedestal has a counterbore 18 in which is secured a nut member 19. The interior bore of the nut member has a spiral thread 20 turned therein, the thread being of semi-circular cross section. The elevating screw 21 also has a spiral thread 22 formed thereon, the cross section of the thread also being of a semi-circular cross section. The screw 21 is keyed at 23 to a bevel gear 24 which is supported for rotation by two sets of anti-friction bearings 25 and 26 in the upper part of the knee 12. It will thus be seen that the screw depends from the knee and is supported for rotation by the knee, and the driving mechanism for rotating the bevel gear 24, is supported by the knee and may be actuated by either manual or power means to be described.

Two sets of recirculating balls, indicated generally by the reference numerals 27 and 28, are interposed between the threads on the screw and the threads of the stationary nut member. It is, of course, necessary to prevent the balls from escaping and therefore return connections are provided for each set and the construction of these return connections is shown more particularly in Figures 5 and 6. From these figures it will be noted that the nut member is provided with a flat face 29 and return tubes 30, which are somewhat U-shaped, have their legs 31 and 32 inserted through bores 33 and 34 in such a manner as to collect the balls from an upper convolution of the thread and return them to a lower convolution, or vice-versa, and in such a manner as to prevent escape of the balls. The return tubes 30 are held in position by a clamping plate 35 which is fastened to the face 29 as by screws 36. The plate has two diagonal grooves 37 formed therein which receive the tubes and hold them tightly in position.

By means of the plurality of sets of recirculating balls, friction between the screw and nut is very greatly reduced. In fact, the friction is reduced to such a point that there is a tendency due to the weight of the parts during downward movement thereof to overrun, and therefore a braking means has been provided in order to retard acceleration of the parts during downward movement. In order to more clearly understand the operation of the braking mechanism, the transmission for driving the bevel gear 24 will be described first.

A typical form of mechanism is shown in Figure 3 and comprises a power driven shaft 38 which may be driven from a prime mover in the column in any suitable manner. This shaft carries a rapid traverse gear 39 which is supported for free rotation in bearings 40 in a wall 41 of the knee, and the gear may be operatively connected to the shaft through the medium of a clutch 42. The shaft 38 also carries a feed gear 43 which is operatively connected through suitable means, not shown, to a bevel gear 44. Any suitable form of variable feed transmission may be interposed between the gears 43 and 44, but since the same forms no part of the present invention it has not been illustrated. Suffice it to say that the gear 44 is a feed gear, the gear 39 is a rapid traverse gear and the clutch 42 determines which gear shall be effective.

The bevel gear 44 drives through a bevel gear 45 an overrunning clutch, indicated generally by the reference numeral 46, whereby when the rapid traverse clutch 42 is disengaged the output shaft 47 of the overrunning clutch is rotated at a slow speed. This shaft carries a main drive gear 48. When the rapid traverse clutch 42 is engaged, the gear 39 drives the gear 48 through the intermediate idler gear couplet 49—50 and the overrunning clutch slips to permit the faster drive.

The main drive gear 48 intermeshes directly with a gear 51 supported for free rotation on shaft 52 and the idler gear 49 is so positioned that it intermeshes with a gear 53 whereby the gears 51 and 53 rotate in opposite directions. An intermediate clutch member 54 keyed to the shaft 52 may be alternately shifted into mesh with either the clutch gear 51 or the clutch gear 53 for rotation of the saddle cross screw 55. In addition, the gears 51 and 53 intermesh with a second pair of gears 56 and 57 which are likewise rotated in opposite directions, and an intermediate clutch member 58 may be alternately shifted to connect these gears for rotation of shaft 59.

This shaft carries a bevel gear 60 which intermeshes with the bevel gear 24 shown in Figure 2 whereby the elevating screw may be power rotated in either a clockwise or counterclockwise direction. The gear 57 has another gear 61 integral therewith which intermeshes with a gear 62 supported on the end of a shaft 63. This shaft is journaled at 64 in a fixed wall 65 of the knee, and the other end of the shaft is journaled at 66 in the front wall 67 of the knee. The shaft 63 is utilized to impart manual rotation to the elevating screw, and to that end is provided with a manually operable handle 68 which is slidably mounted on the outer end of the shaft. The hub 69 of the handle is connected by interengaging clutch teeth 70 to a clutch member 71 which is pinned at 72 to the shaft 63.

A spring 73 is interposed between the members 69 and 71 for normally maintaining the member 69 out of operative engagement with the clutch member 71, whereby during power rotation the handle 68 will not be revolved. It has been found, that on account of the great reduction in friction effected by the improved nut mechanism, that there is a tendency to overrun during downward movement of the knee, and therefore, means have been introduced to effect a braking action during such downward movement so that the moving member will not gain too much momentum. To this end, the shaft 63 has mounted thereon for free rotation a sleeve 75. This sleeve carries a plurality of plates 76 splined thereon as shown in Figure 7 between which are interposed a second plurality of plates 77 which, as shown in Figure 7, are provided with ears 78 which project into slots 79 formed in a fixed sleeve 79a and thereby are held against rotation. These plates constitute a braking means and the amount of friction developed is determined by the adjustment of a spring 80 by which the plates are squeezed between member 81 and the adjusting nut 82.

Referring to Figure 4, the member 81 is so formed as to provide a ratchet means whereby upon rotation of the shaft 63 the brake becomes effective, but upon rotation in the other direction the brake becomes ineffective. The purpose of this is to have the brake effective during downward movement of the knee structure, but ineffective during upward movement thereof. This ratchet mechanism comprises a series of rollers 83 which are normally urged outward by springs 84 in a direction to wedge between the interior bore 85 of a member 86 which is pinned to the shaft 63 at 87. The shaft 63 thus drives through the pin 87, the member 86, which upon rotation in a clockwise direction, as viewed in Figure 4, will cause the rollers 83 to move in a wedging direction, causing rotation of the member 81 which is splined to the sleeve 75 through the splines 88.

Upon rotation in the opposite direction the rollers 83 are urged in a non-wedging direction whereby slippage takes place and the member 81 is not actuated. It will now be apparent that regardless of whether the shaft 63 is rotated manually by the handle 68 or is rotated by the power mechanism through gear 61, the braking mechanism will function during one direction of rotation of the shaft and will be ineffective during the other and in an automatic manner.

Referring to Figure 2 the pedestal 17 has an interior bore through which the elevating screw passes and the lower end of this bore is closed by a cup-shaped member 89. This entire bore may be filled with lubricating oil for lubricating the screw and nut mechanism. In order to maintain a more uniform temperature throughout the pedestal and in relation to the knee, passages have been formed in the pedestal and in the knee in such a manner that coolant applied to work on the table may be conducted to a reservoir 90 formed in the base 16 in such a manner that it will pass in heat-exchanging relationship to the pedestal.

In this connection the knee is provided with a passageway 91 which normally receives coolant from the table and this passage is connected to an opening 92 in the inner wall of the knee which surrounds the pedestal. By providing this opening, the coolant may flow through an annular passage 93, the inner wall of which comprises telescoping tubes 94 and 95, the tube 94 being fixed with the base member 16 and the tube 95 being attached to the knee.

The outer wall of this annular passage is composed also of a series of telescoping tubes 96, the inner one of which is attached by screws 97 to the knee for movement therewith and the outer tube 98 is attached by screws 99 to the base 16. The coolant thus flows in close relationship to the telescoping tubes 94 and 95 and thereby serve to conduct heat away from the pedestal 17 to maintain the temperature thereof substantially uniform and thereby prevent expansion thereof which might tend to vary the height of the nut member in the upper extremity thereof and cause a variation in the height of the table relative to the base of the machine. The coolant flowing through the passage 93 may flow through an interconnecting passage 100 which is formed in the base 16 to the reservoir 90.

Suitable mechanism which forms no part of the present invention is, of course, utilized for withdrawing the coolant from the reservoir 90 and pumping it to a suitable elevation for application to work on the table.

There has thus been provided an improved mechanism for elevating a movable member of a machine tool, such as a milling machine, in a manner which greatly reduces the friction and concomitantly the power required to elevate the knee. Due to the great reduction in friction effected, automatic braking means have also been provided which prevent undue acceleration of the parts during downward movement. The mechanism has also been so contrived that utilization may be made of the coolant supply normally available in such machines for maintaining a more uniform temperature of the operating parts and thereby preserving the accuracy and precision of the machine.

What is claimed is:

1. In a machine tool having a tool support and a work support, the combination of means for effecting relative vertical adjustment between said supports including an anti-friction connection between the final driven member of said adjusting means which is carried by one of said supports and its cooperative member carried by the other support, means to effect reverse actuation of said adjusting means to raise or lower the movable support, and means automatically responsive to the direction of actuation that causes a lowering movement to create a frictional drag on the final driven member, said last-named means being automatically released upon reversal in the direction of actuation.

2. In a knee elevating mechanism for a milling machine, the combination with a knee mounted on a fixed support, of an elevating screw carried by the knee, a cooperating anti-friction nut member carried by the fixed support, means to effect relative rotation between the screw and nut in opposite directions to raise or lower the knee, a braking means, and means responsive to the direction of said rotation for automatically applying said braking means to said rotating means during lowering of the knee, and releasing said braking means upon elevation of the knee.

3. In a milling machine having a column, a tool spindle journaled in the column and a knee vertically adjustable on the column for positioning work relative to the spindle, the combination of actuating means for vertically adjusting the knee including an elevating screw, an anti-friction nut member for supporting the screw, means to effect relative rotation between the screw and nut, a braking means applicable to said rotating means to produce a retarding effect thereon during downward movement of the knee and non-applicable during upward movement of the knee, and means to adjust said braking means to vary the retarding effect thereof.

4. In a milling machine having a column, and a knee adjustably mounted on the column, the combination of mechanism for raising and lowering the knee including an anti-friction screw and nut mechanism, a manually operable shaft carried by the knee, means operatively connecting the shaft for effecting relative actuation between the screw and nut, a frictional braking means, and a unidirectional clutch interconnecting said shaft with said braking means whereby upon rotation of said shaft in one direction for raising the knee the braking means will be ineffective and upon rotation in the other direction the braking means will become effective.

5. In a milling machine, the combination with a column and a knee adjustably mounted on the column for vertical movement relative to a tool spindle carried by the column, the combination of means for effecting said movement including an elevating screw carried by the knee, an anti-friction nut member fixedly supported in cooperative relation to said screw, means carried by the knee for rotating said screw including a shaft, a friction-creating device including a plurality of fixed plates, a plurality of movable plates, means to adjust the friction between said plates, and a unidirectional clutch operatively connecting said movable plates to said shaft whereby said friction device will be effective during lowering of said knee.

6. In a milling machine having a column, a knee adjustably mounted on the column, a tool spindle carried by the column, the combination of means for raising and lowering said knee including a power shaft journaled in the knee, an anti-friction screw and nut member for effecting movement of the knee, said screw being journaled in the knee, means for operatively connecting said screw to the power shaft, a friction-creating device, and means responsive to one direction of rotation of said power shaft for automatically connecting said friction device thereby to produce a retarding effect during downward movement of the knee.

7. In a milling machine having a column, a tool spindle journaled in the column and a knee slidably mounted on the column for movement toward and from the spindle, the combination of means for effecting said movement including a power operable shaft and a manually operable shaft journaled in the knee, an anti-friction screw and nut mechanism, one of which is fixed and the other journaled in the knee, means operatively connecting said shafts to said movable member, a friction-creating device, and means responsive to rotation of either of said shafts in a direction to move the knee from the spindle to render said friction device effective in retarding movement of the knee, said friction creating device being releasable upon reversal in the direction of said rotation.

LESTER F. NENNINGER.
FRED A. HASSMAN.